US012763347B2

(12) United States Patent
Park

(10) Patent No.: US 12,763,347 B2
(45) Date of Patent: Oct. 13, 2026

(54) SYSTEM AND METHOD FOR FUEL CELL

(71) Applicants: Hyundai Motor Company, Seoul (KR); Kia Corporation, Seoul (KR)

(72) Inventor: Jun Young Park, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 595 days.

(21) Appl. No.: 18/116,702

(22) Filed: Mar. 2, 2023

(65) Prior Publication Data

US 2024/0105975 A1 Mar. 28, 2024

(30) Foreign Application Priority Data

Sep. 27, 2022 (KR) ........................ 10-2022-0122700

(51) Int. Cl.

*H01M 8/0438* (2016.01)
*G05D 16/20* (2006.01)
*H01M 8/04082* (2016.01)
*H01M 8/04089* (2016.01)
*H01M 8/0444* (2016.01)
*H01M 8/04537* (2016.01)
*H01M 8/04746* (2016.01)

(52) U.S. Cl.

CPC .... *H01M 8/04388* (2013.01); *G05D 16/2013* (2013.01); *H01M 8/04089* (2013.01); *H01M 8/04201* (2013.01); *H01M 8/04447* (2013.01); *H01M 8/04589* (2013.01); *H01M 8/04753* (2013.01)

(58) Field of Classification Search

CPC ................................................ H01M 8/04388
See application file for complete search history.

(56) References Cited

U.S. PATENT DOCUMENTS

2018/0006319 A1 1/2018 Asai
2020/0185743 A1 * 6/2020 Bae .................. H01M 8/04753

FOREIGN PATENT DOCUMENTS

KR 10-2018-0121212 11/2018

* cited by examiner

*Primary Examiner* — Brian R Ohara
(74) *Attorney, Agent, or Firm* — MORGAN, LEWIS & BOCKIUS LLP

(57) ABSTRACT

A fuel cell system including an ejector provided in a hydrogen supply line, a hydrogen pressure sensor provided in the hydrogen supply line at a front end portion of the ejector and configured to measure a pressure of hydrogen flowing in from a hydrogen tank, a supply valve provided in the hydrogen supply line at a front end portion of the hydrogen pressure sensor and configured to control a flow rate of the hydrogen supplied from the hydrogen tank to an anode of a fuel cell stack, a discharge valve provided in a hydrogen discharge line, and a controller that estimates the pressure of the hydrogen flowing into the anode of the fuel cell stack from a rear end portion of the ejector for each open or closed state of each of the supply and discharge valves, and controls the supply and discharge valves based on a pressure estimate value of the hydrogen, and a control method thereof.

10 Claims, 4 Drawing Sheets

SYSTEM AND METHOD FOR FUEL CELL

CROSS REFERENCE TO RELATED APPLICATION

The present application claims priority to Korean Patent Application No. 10-2022-0122700, filed Sep. 27, 2022, the entire contents of which is incorporated herein for all purposes by this reference.

BACKGROUND OF THE PRESENT DISCLOSURE

Field of the Present Disclosure

The present disclosure relates to a fuel cell system and a control method thereof, and more particularly, to a fuel cell system configured for estimating the pressure of hydrogen flowing into the anode of a fuel cell stack for each open or closed state of each of a supply valve and a discharge valve, and performing feedback control of the supply valve and discharge valve based on the pressure estimate value of hydrogen, and a control method thereof.

Description of Related Art

Recently, the supply of eco-friendly vehicles such as electric vehicles is expanding due to environmental issues of internal combustion engine vehicles. In general, an electronic vehicle (EV) refers to a vehicle that travels using the driving force of a motor driven by electrical energy.

As the electronic vehicle, there is a hybrid electric vehicle (HEV) that provides driving power to a motor using electrical energy charged in a high voltage battery for a vehicle together with an existing internal combustion engine, a fuel cell electric vehicle (FCEV) that provides driving power to a motor using the electrical energy generated through a fuel cell, or the like.

A fuel cell mounted on a fuel cell vehicle refers to a device that receives hydrogen and air from the outside thereof and generates electrical energy through an electrochemical reaction inside a fuel cell stack.

A fuel cell vehicle includes a fuel cell stack in which a plurality of fuel cell cells used as a power source is stacked, a fuel supply system that supplies hydrogen as fuel to the fuel cell stack, an air supply system that supplies oxygen, an oxidizing agent required for electrochemical reactions, and a thermal management system that utilizes coolant or the like to control the temperature of the fuel cell stack.

The fuel supply system depressurizes compressed hydrogen inside a hydrogen tank and supplies the hydrogen to the anode (fuel electrode) of the fuel cell stack, and the air supply system operates an air compressor to supply drawn external air to the cathode (air electrode) of the fuel cell stack.

When hydrogen is supplied to the anode of the fuel cell stack, the oxidation reaction of hydrogen proceeds at the anode to generate hydrogen ions (protons) and electrons. The generated hydrogen ions and electrons move to the cathode through an electrolyte membrane and a separator, respectively. At the cathode, water is generated through an electrochemical reaction in which the hydrogen ions and electrons moved from the anode and oxygen in the air participate, and electrical energy is produced from the flow of these electrons.

In such a fuel cell, it is preferable that the supply amount of a reactant gas (oxygen and hydrogen in the air) is precisely controlled according to driving environment such as a required output of the fuel cell vehicle. Therefore, in general, a fuel cell system includes pressure sensors (such as a hydrogen pressure sensor and an air pressure sensor) for measuring the pressure of the reaction gas.

To follow a target pressure of hydrogen supplied to the anode of the fuel cell stack (the target pressure of hydrogen is set according to the required output of the vehicle), the fuel cell system performs a feedback control of the supply valve for supplying hydrogen to the anode of the fuel cell stack from the hydrogen tank based on the measured value of a hydrogen pressure sensor.

However, because the hydrogen pressure sensor is unavoidable to generate an offset due to its characteristics, an error may occur in the measured hydrogen pressure value, and a failure may occur in the hydrogen pressure sensor itself when used for a long time period. Accordingly, there is a problem in that excessive or insufficient hydrogen in the anode of the fuel cell stack occurs.

To solve the present problem, a technology having two hydrogen pressure sensors in a conventional fuel cell system has been provided. The hydrogen pressure sensor performs the feedback control of the supply valve based on the average of the measured values of each sensor, and when the difference between the measured values of the respective sensor exceeds a predetermined reference value, the sensor failure is determined, and the offset correction of the hydrogen pressure sensor based on atmospheric pressure is performed with the discharge valve open.

However, in the present conventional art, when all of the measured values of each hydrogen pressure sensor are lower or higher than an actual pressure, the sensor offset in the same direction occurs, so that it is impossible to determine the failure condition of the pressure sensor.

Moreover, when each hydrogen pressure sensor simultaneously malfunctions or excessive offset occurs simultaneously, there is a problem in that the fuel cell system cannot be started and operated itself.

Therefore, it is urgent to provide a technology capable of estimating the pressure of hydrogen even when a problem occurs in a plurality of hydrogen pressure sensors at the same time as described above.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell system which can estimates a hydrogen pressure even when a problem occurs in a plurality of hydrogen pressure sensors simultaneously, by establishing the pressure of hydrogen flowing into the anode of a fuel cell stack for each open or closed state of each of a supply valve and a discharge valve, and performing the feedback control of the supply valve and discharge valve based on the pressure estimate vale of hydrogen, and a control method thereof.

In various aspects of the present disclosures, a fuel cell system according to an exemplary embodiment of the present disclosure includes an ejector provided in a hydrogen supply line, a hydrogen pressure sensor provided in the hydrogen supply line at a front end portion of the ejector and configured to measure a pressure of hydrogen flowing in from a hydrogen tank, a supply valve provided in the hydrogen supply line at a front end portion of the hydrogen pressure sensor and configured to control a flow rate of the hydrogen supplied from the hydrogen tank to an anode of a fuel cell stack, a discharge valve provided in a hydrogen discharge line, and a controller that estimates the pressure of the hydrogen flowing into the anode of the fuel cell stack from a rear end portion of the ejector for each open or closed state of each of the supply and discharge valves, and is configured to control the supply and discharge valves based on a pressure estimate value of the hydrogen.

The controller of the fuel cell system according to an exemplary embodiment of the present disclosure may estimate the pressure of the hydrogen measured by the hydrogen pressure sensor as an initial pressure of the hydrogen flowing into the anode of the fuel cell stack from the rear end portion of the ejector.

The controller of the fuel cell system according to an exemplary embodiment of the present disclosure may determine a target supply pressure of the hydrogen and a target discharge flow rate of the hydrogen based on a pressure estimate value of the hydrogen, and may control the supply valve based on the target supply pressure of the hydrogen, and is configured to control the discharge valve based on the target discharge flow rate of the hydrogen.

The controller of the fuel cell system according to an exemplary embodiment of the present disclosure may derive a target supply flow rate of the hydrogen based on a required current of the fuel cell stack, and may determine the target supply pressure of the hydrogen based on the target supply flow rate of the hydrogen and the pressure estimate value of the hydrogen.

The controller of the fuel cell system according to an exemplary embodiment of the present disclosure may derive a concentration estimate value of the hydrogen inside the anode based on the pressure estimate value of the hydrogen, and may determine a target discharge flow rate of the hydrogen based on the concentration estimate value of the hydrogen.

The controller of the fuel cell system according to an exemplary embodiment of the present disclosure may derive a change amount in flow rate of gas inside the anode for each open or closed state of each of the supply valve and the discharge valve, may determine a change amount in the pressure inside the anode based on the derived change amount in the flow rate of the gas, and may estimate the pressure of the hydrogen flowing into the anode of the fuel cell stack from the rear end portion of the ejector based on the determined change amount in the pressure.

The controller of the fuel cell system according to an exemplary embodiment of the present disclosure may determine a consumption amount of the hydrogen inside the anode and a supply amount of the hydrogen supplied into the anode in a state in which the supply valve is open and the discharge valve is closed, and may derive a change amount in flow rate of gas inside the anode based on the determined consumption amount of the hydrogen and the determined supply amount of the hydrogen.

The controller of the fuel cell system according to an exemplary embodiment of the present disclosure may determine the consumption amount of the hydrogen inside the anode based on an output current of the fuel cell stack in a state in which the supply valve is open and the discharge valve is closed, and may determine the supply amount of the hydrogen supplied into the anode based on a pressure estimate value of the hydrogen and the pressure of the hydrogen measured by the hydrogen pressure sensor in a state in which the supply valve is open and the discharge value is closed.

The controller of the fuel cell system according to an exemplary embodiment of the present disclosure may determine a consumption amount of the hydrogen inside the anode and a discharge amount of the gas discharged through the discharge valve in a state in which the supply valve is closed and the discharge valve is open, and may derive the change amount in the flow rate of the gas inside the anode based on the determined consumption amount of the hydrogen and the determined discharge amount of the gas.

The controller of the fuel cell system according to an exemplary embodiment of the present disclosure may determine the consumption amount of the hydrogen inside the anode based on an output current of the fuel cell stack in a state in which the supply valve is closed and the discharge valve is open, and may determine the discharge amount of the gas discharged through the discharge valve based on a pressure estimate value of the hydrogen and a pressure difference between an inlet and outlet of the discharge valve in a state in which the supply valve is closed and the discharge valve is open.

The controller of the fuel cell system according to an exemplary embodiment of the present disclosure may determine the consumption amount of the hydrogen inside the anode based on an output current of the fuel cell stack in a state in which the supply valve and the discharge valve are closed, and may derive the change amount in the fluid rate of the gas inside the anode based on the determined consumption amount of the hydrogen.

A method for controlling the fuel cell system includes the steps of estimating, by the controller, the pressure of the hydrogen flowing into the anode of the fuel cell stack from the rear end portion of the ejector for each open or closed state of each of the supply valve and the discharge valve, and controlling, by the controller, the supply valve and the discharge valve based on a pressure estimate value of the hydrogen.

In the method for controlling the fuel cell system, the step of estimating the pressure of the hydrogen flowing into the anode of the fuel cell stack from the rear end portion of the ejector may include the steps of deriving, by the controller, a change amount in flow rate of gas inside the anode for each open or closed state of each of the supply valve and the discharge valve, determining, by the controller, a change amount in the pressure inside the anode based on the derived change amount in the flow rate of the gas, and estimating, by the controller, the pressure of the hydrogen flowing into the anode of the fuel cell stack from the rear end portion of the ejector based on the determined change amount in the pressure.

In the method for controlling the fuel cell system, the step of deriving the change amount in the flow rate of the gas inside the anode may include the steps of determining, by the controller, a consumption amount of the hydrogen inside the anode, determining, by the controller, a supply amount of the hydrogen supplied into the anode or a discharge amount of the gas discharged through the discharge valve when either the supply valve or the discharge valve is in an open state, and deriving, by the controller, the change amount in the flow rate of the gas inside the anode based on the determined consumption amount of the hydrogen, the determined supply amount of the hydrogen, and the determined discharge amount of the gas.

In the method for controlling the fuel cell system, the step of controlling the supply valve and the discharge valve may include the steps of determining, by the controller, a target supply pressure of the hydrogen and a target discharge flow rate of the hydrogen based on a pressure estimate value of the hydrogen, controlling, by the controller, the supply valve based on the target supply pressure of the hydrogen, and controlling, by the controller, the discharge valve based on a target discharge flow rate of the hydrogen.

According to the fuel cell system and control method of the present disclosure, the following effects are obtained.

First, by estimating the pressure of hydrogen flowing into the anode of the fuel cell stack for each open or closed state of each of the supply valve and the discharge valve, it is possible to estimate the pressure of hydrogen even if a problem occurs in a plurality of hydrogen pressure sensors at the same time.

Second, by performing the feedback control of the supply valve and discharge valve based on the pressure estimate value of the hydrogen, it is possible to prevent excessive or insufficient hydrogen in the anode of the fuel cell stack.

Third, by preventing excessive or insufficient hydrogen in the anode, durability of the fuel cell stack and fuel efficiency of the vehicle may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
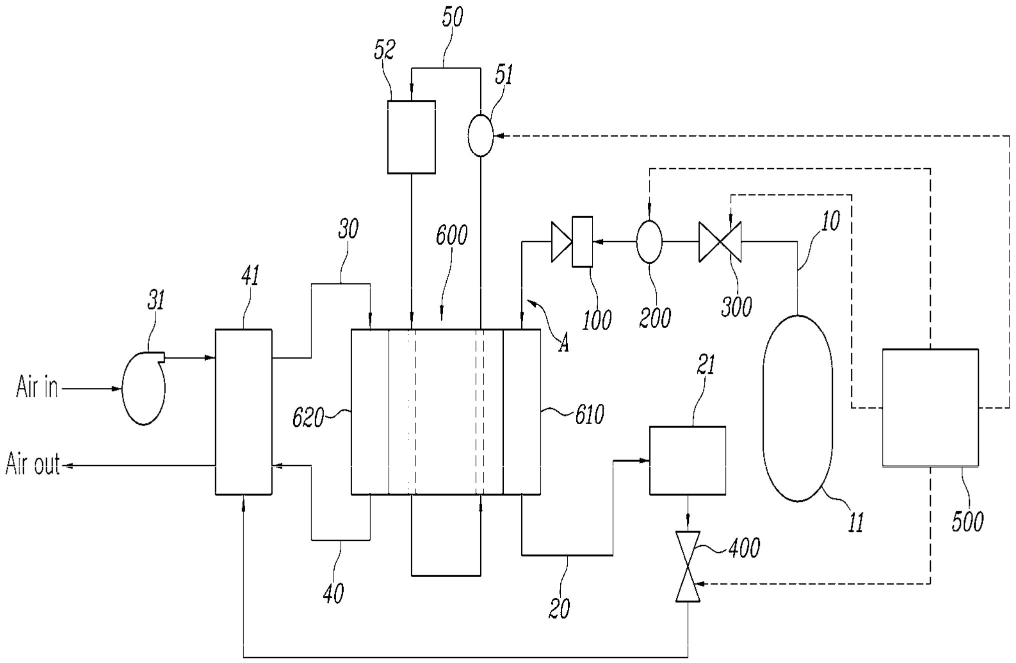
FIG. 1 is a view exemplarily illustrating a fuel cell system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the present specification, terms such as “comprises” or “have” are intended to designate the presence of a feature, number, step, operation, component, part, or combination thereof described in the specification, and it should be understood that this does not preclude the possibility of addition or presence of one or more other features, numbers, steps, operations, components, parts, or combinations thereof.

Also, terms including an ordinal number, such as first, second, etc., may be used to describe various components, but the components are not limited by the terms. The above terms are used only for distinguishing one component from another.

In describing the exemplary embodiments included in the present specification, if it is determined that detailed descriptions of related known technologies may obscure the gist of the exemplary embodiments included in the present specification, the detailed description thereof will be omitted. Furthermore, the accompanying drawings are only for easy understanding of the exemplary embodiments included in the present specification, and the technical idea included herein is not limited by the accompanying drawings, and it should be understood to include all modifications, equivalents and substitutes included in the spirit and scope of the present disclosure.

A controller 500 according to the exemplary embodiment included in the present specification may include a communication device, which communicates with other controller 500 or a sensor for control of function peculiar thereto, a memory, which stores therein an operating system, logic commands, input/output information, etc., and one or more processors, which perform determinations, calculations, and decisions necessary for control of the function peculiar thereto.

Hereinafter, the configuration and working principle of various embodiments of the included disclosure will be described in detail with reference to the accompanying drawings, but the same or similar components are provided the same reference numbers regardless of the drawing numerals, and the redundant description thereof will be omitted.

Figure 2:
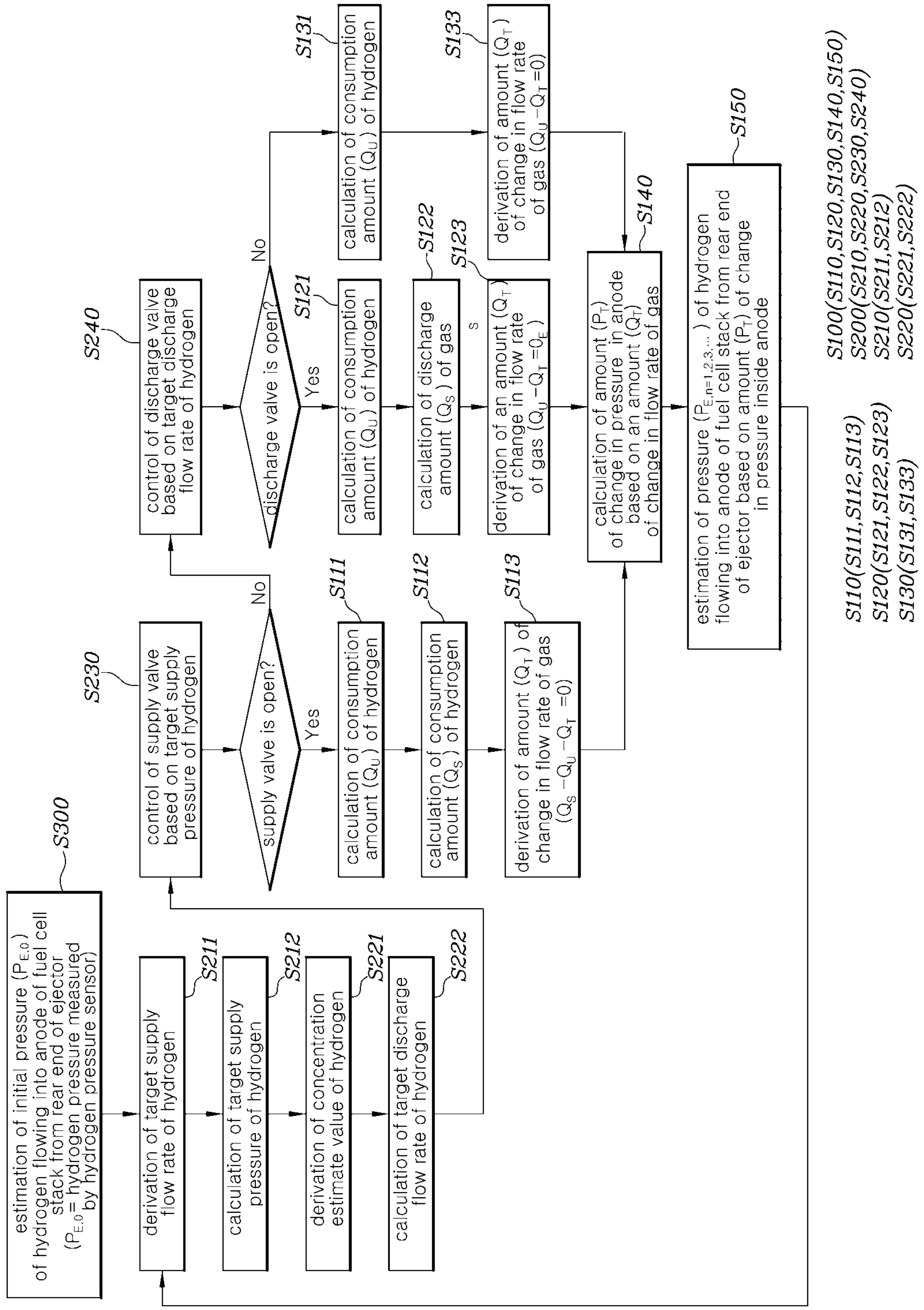
FIG. 2 is a flowchart of a method for controlling a fuel cell system according to an exemplary embodiment of the present disclosure.
Figure 3:
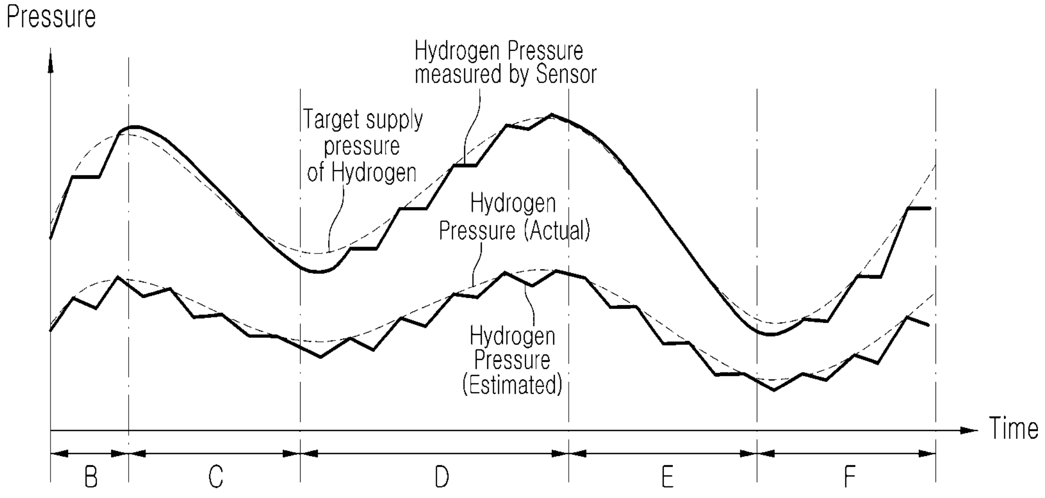
FIG. 3 is a view for describing estimating the pressure of hydrogen flowing into an anode of a fuel cell stack from a rear end portion of an ejector for each open or closed state of each of a supply valve and a discharge valve.
Figure 4:
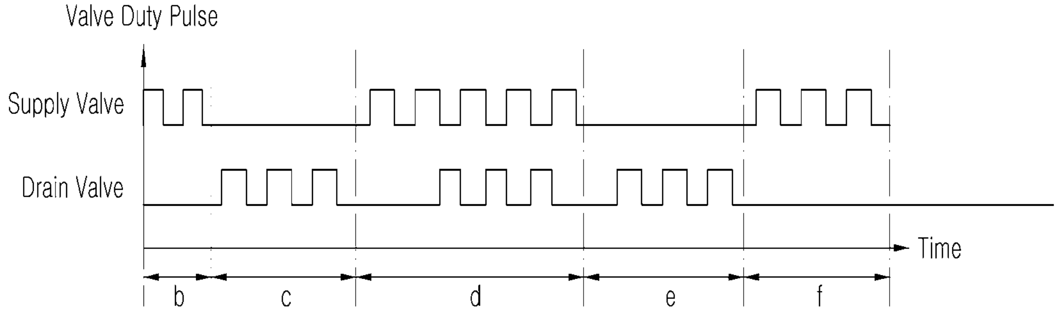
FIG. 4 is a view exemplarily illustrating variably controlling an open duty pulse of each of a supply valve and a discharge valve based on a pressure estimate value of hydrogen.
Figure 5:
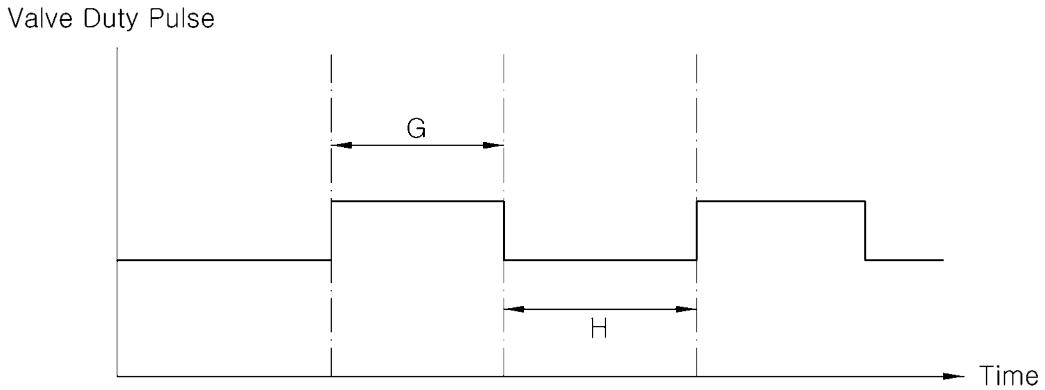
FIG. 5 is a view for describing open duty pulses of a supply valve and a discharge valve.

FIG. 1 is a view exemplarily illustrating a fuel cell system according to an exemplary embodiment of the present disclosure, FIG. 2 is a flowchart of a method for controlling a fuel cell system according to an exemplary embodiment of the present disclosure, FIG. 3 is a view for describing estimating the pressure of hydrogen flowing into an anode 610 of a fuel cell stack 600 from a rear end portion of an ejector 100 for each open or closed state of each of a supply valve 300 and a discharge valve 400, FIG. 4 is a view exemplarily illustrating variably controlling an open duty pulse of each of the supply valve 300 and the discharge valve 400 based on a pressure estimate value of hydrogen, and FIG. 5 is a view for describing open duty pulses of the supply valve 300 and the discharge valve 400.

Referring to FIG. 1, a fuel cell system according to an exemplary embodiment of the present disclosure includes an ejector 100 provided in a hydrogen supply line 10, a hydrogen pressure sensor 200 provided in the hydrogen supply line 10 at a front end portion of the ejector 100 to measure the pressure of hydrogen flowing in from the hydrogen tank 11, a supply valve 300 provided in the hydrogen supply line 10 at a front end portion of the hydrogen pressure sensor 200 to control the flow rate of the hydrogen supplied from the hydrogen tank 11 to the anode 610 of the fuel cell stack 600, a discharge valve 400 provided in a hydrogen discharge line 20, and a controller 500 that is configured to estimate the pressure of the hydrogen flowing into the anode 610 of the fuel cell stack 600 from a rear end portion of the ejector 100 and is configured to control the supply valve 300 and the discharge valve 400 based on the pressure estimate value of the hydrogen.

To facilitate understanding of the present disclosure, a schematic configuration of a general fuel cell system will be first described with reference to FIG. 1.

A fuel supply system for supplying hydrogen as a fuel to the fuel cell stack 600 is illustrated on the right in FIG. 1, an air supply system for supplying oxygen, which is an oxidizing agent required for an electrochemical reaction, is illustrated on the left in FIG. 1, and a thermal management system using coolant, etc. to control the temperature of the fuel cell stack 600 is illustrated in the central portion in FIG. 1.

The fuel supply system depressurizes the compressed hydrogen inside the hydrogen tank 11 and supplies the depressurized compressed hydrogen to the anode 610 of the fuel cell stack 600, and the air supply system operates an air compressor 31 to supply drawn external air to the cathode 620 of the fuel cell stack 600. The thermal management system drives a cooling device 52 to circulate coolant along a cooling line 50, preventing the fuel cell stack 600 from being overheated according to the electrochemical reaction.

The fuel supply system includes the hydrogen supply line 10 through which hydrogen is supplied from the hydrogen tank 11 to the anode 610 of the fuel cell stack 600 and the hydrogen discharge line 20 through which unreacted hydrogen is discharged to the outside.

The hydrogen tank 11 in which the compressed hydrogen is stored is provided at the front end portion of the hydrogen supply line 10, and the rear end portion of the hydrogen supply line 10 is connected to the anode 610. The supply valve 300, the hydrogen pressure sensor 200, and the ejector 100 are sequentially provided between the hydrogen tank 11 and the anode 610.

The supply valve 300 adjusts the flow rate of hydrogen supplied from the hydrogen tank 11 to the anode 610, and the ejector 100 is configured to reduce the pressure of the compressed hydrogen by injecting high-pressure hydrogen using a nozzle. The hydrogen pressure sensor 200 measures the pressure of hydrogen flowing into the ejector 100 from the hydrogen tank 11 through the supply valve 300.

The front end portion of the hydrogen discharge line 20 is connected to the anode 610 and the rear end portion of the hydrogen discharge line 20 is connected to an external exhaust line. In the fluid discharged through the hydrogen discharge line 20, unreacted hydrogen and condensate (water), which is a by-product of the electrochemical reaction, exist together. Therefore, the hydrogen discharge line 20 may include a water trap 21 for collecting and discharging the condensate to the outside. The condensate flows into an air humidifier 41 before being discharged to the outside and may be used for humidifying the air supplied to the cathode 620. Furthermore, the discharge valve 400 for discharging unreacted hydrogen and water to the outside may be provided between the water trap 21 and the air humidifier 41.

Meanwhile, a typical fuel cell system includes a sensor (which refers to the hydrogen pressure sensor 200 according to an exemplary embodiment of the present disclosure illustrated in FIG. 1) for measuring the pressure of hydrogen flowing into the ejector 100 from the hydrogen tank 11 through the supply valve 300, and a sensor (hereinafter, referred to as a 'hydrogen low pressure sensor') for measuring the pressure of hydrogen flowing into the anode 610 through the ejector 100. That is, the hydrogen low pressure sensor is provided at point A in FIG. 1, and it is common to estimate the pressure of hydrogen inside the anode 610 based on the hydrogen pressure measured by the hydrogen low pressure sensor.

In the instant case, to minimize the error caused by the offset or failure of the hydrogen low pressure sensor, the conventional fuel cell system includes a plurality of hydrogen low pressure sensors to perform the feedback control of the supply valve 300 based on the average of the measured values of each sensor.

However, as discussed in the description of related art above, when a problem occurs in a plurality of low-hydrogen pressure sensors at the same time (for example, when the measured values of the respective hydrogen low-pressure sensors are all measured lower or higher than an actual pressure, resulting in a sensor offset in the same direction), it is impossible to accurately estimate the pressure of hydrogen inside the anode 610.

Accordingly, the fuel cell system according to an exemplary embodiment of the present disclosure intends to estimate the pressure (which refers to the pressure at point an in FIG. 1) of hydrogen incoming to the anode 610 through the ejector 100, based on the measured pressure value of hydrogen flowing into the ejector 100 from the hydrogen tank 11 through the supply valve 300. Then, the fuel cell system can finally estimate the pressure of hydrogen inside the anode 610 based on the pressure of hydrogen flowing into the anode 610 through the ejector 100.

Accordingly, there is an effect of estimating the pressure of hydrogen inside the anode 610 even when a problem occurs in a plurality of low pressure sensors at the same time or when there is no low pressure sensor itself (when the fuel cell system is configured as illustrated in FIG. 1).

For reference, the pressure of hydrogen flowing into the anode 610 of the fuel cell stack 600 from the rear end portion of the ejector 100 may be estimated differently for each open or closed state of each of the supply valve 300 and the discharge valve 400. A specific operating principle in this regard will be described later.

Next, the air supply system includes the air supply line 30 to supply air to the cathode of the fuel cell stack 600 from the outside thereof, and the air discharge line 40 to discharge air after the reaction to the outside. Although not illustrated in FIG. 1, it is obvious in the field of the present disclosure of the present disclosure that a plurality of sensors for measuring air pressure may be provided in the air supply system.

The air compressor 31 for drawing outside air is provided at the front end portion of the air supply line 30, and the rear end portion of the air supply line 30 is connected to the cathode 620. In a fuel cell, moisture (water) acts as a transport medium for hydrogen ions. Therefore, the air that has passed through the air compressor 31 may be appropriately humidified by the air humidifier 41 before being introduced into the cathode 620.

For reference, the air humidifier 41 may be provided in the air supply line 30 and the air discharge line 40 at the same time. The air humidifier 41 is generally formed with a separate membrane through which moisture can permeate therein. Based on the present membrane, the inside of the air humidifier 41 is called a lumen side and the outside of the air humidifier 41 is called a shell side thereof.

The air introduced into the air humidifier 41 on the air supply line 30 passes through the lumen side, and the air reintroduced into the air humidifier 41 on the air discharge line 40 flows into the shell side thereof. Since the air reintroduced into the air humidifier 41 on the air discharge line 40 includes a small amount of moisture generated according to the electrochemical reaction, the moisture humidifies the air while permeating from the shell side to the lumen side thereof.

Subsequently, the thermal management system may include the cooling line 50 through which coolant is circulated, the cooling device 52 provided in the cooling line 50 to generate a flow of coolant, and a coolant temperature sensor 51 for measuring the temperature of the coolant.

Furthermore, the fuel cell system may include a high voltage junction box connected to the fuel cell stack 600 and a high voltage line to receive power from the fuel cell and supply the power to a load of the vehicle. A current sensor for measuring the intensity of the current generated by the fuel cell stack 600 may be provided on the high voltage line. Here, it is understood that the load of the vehicle includes other high-voltage auxiliary devices that require power supply, such as the motor, heater, air conditioner, and cooling fan of the vehicle.

Meanwhile, the controller 500 of the fuel cell system according to an exemplary embodiment of the present disclosure may control the supply valve 300 and the discharge valve 400 based on a pressure estimate value of hydrogen. In the instant case, the supply valve 300 and the discharge valve 400 may be controlled according to specific conditions derived based on the measured values measured by the hydrogen pressure sensor 200, the coolant temperature sensor 51 and the current sensor described above. Here, specific conditions will be described later.

As a result, the controller 500 of the present disclosure is configured to control the supply valve 300 and the discharge valve 400 based on the pressure estimate value of hydrogen, and performs the feedback control of the supply valve 300 and discharge valve 400 by differently estimating the pressure estimate value of hydrogen for each open or closed state of each of the supply valve 300 and the discharge valve 400.

Accordingly, it is possible to prevent excessive or insufficient hydrogen in the anode 610, and ultimately, there is an effect of improving durability of the fuel cell stack 600 and fuel efficiency of the vehicle.

Hereinafter, the operating principle of the feedback control of the supply valve 300 and discharge valve 400 will be described in detail with reference to FIG. 2, FIG. 3, FIG. 4 and FIG. 5.

The controller 500 of the fuel cell system according to an exemplary embodiment of the present disclosure may estimate the hydrogen pressure measured by the hydrogen pressure sensor 200 as the initial pressure of hydrogen flowing into the anode 610 of the fuel cell stack 600 from the rear end portion of the ejector 100. This is represented by 'S300' in the method for controlling the fuel cell system according to an exemplary embodiment of the present disclosure illustrated in FIG. 2.

As described above, the controller 500 of the present disclosure performs the feedback control of the supply valve 300 and discharge valve 400 by estimating the pressure estimate value of hydrogen for each open or closed state of each of the supply valve 30 and the discharge valve 400 while controlling the supply valve 300 and the discharge valve 400 based on the pressure estimate value of hydrogen.

In the instant case, the pressure estimate value of hydrogen cannot be estimated before the control of the supply value 300 and discharge valves 400 is performed. Therefore, instead of estimating the initial pressure estimate value $P_{E,0}$ of hydrogen differently for each open or closed state of the supply valve 300 and the discharge valve 400, the hydrogen pressure measured by the hydrogen pressure sensor 200 is estimated and used as the initial pressure of hydrogen.

The controller 500 of the present disclosure is configured to control the supply valve 300 and the discharge valve 400 based on the initial pressure ($P_{E,0}$) of hydrogen estimated as described above, and differently estimates the pressure estimate value ($P_{E,n=1,\ 2,\ 3\ \ldots}$) of hydrogen for each open or closed state of the supply valve 300 and discharge valve 400. Accordingly, the controller 500 may perform the feedback control of the supply valve 300 and discharge valve 400 during the control process (n=1, 2, 3 . . . ) after the initial control (n=0).

Hereinafter, in an exemplary embodiment of the present disclosure, the 'control process of the supply valve 300 and discharge valve 400 based on the pressure estimate value of hydrogen' and the 'process of differently estimating the pressure estimate value of hydrogen for each open or closed state of each of the supply valve 300 and the discharge valve 400' will be described in detail.

First, the 'control process of the supply valve 300 and discharge valve 400 based on the pressure estimate value of hydrogen' will be described.

The controller 500 of the fuel cell system according to an exemplary embodiment of the present disclosure may determine a target supply pressure of hydrogen and a target discharge flow rate of hydrogen based on the pressure estimate value of hydrogen, may control the supply valve 300 based on the target supply pressure of hydrogen, and may control the discharge valve 400 based on the target discharge flow rate of hydrogen.

That is, the controller 500 of the present disclosure may determine a target supply pressure of hydrogen based on the pressure estimate value of hydrogen, and may control the supply valve 300 based on the determined target supply pressure of hydrogen (which is represented by S210 and S230 in FIG. 2), may determine the target discharge flow rate of hydrogen based on the pressure estimate value of hydrogen, and may control the discharge valve 400 based on the determined target flow rate of hydrogen (which is represented by S220 and S240 in FIG. 2).

In the instant case, the target supply pressure of hydrogen may be determined based on the pressure estimate value of hydrogen and the target supply flow rate of hydrogen (which is represented by S212 in FIG. 2). Here, the target supply flow rate of hydrogen may be derived based on the required current of the fuel cell stack 600 (represented by S211 in FIG. 2).

The required current of the fuel cell stack 600 is a value determined according to the required output of the vehicle, and may be determined according to a data map provided in advance based on the target flow rate of air supplied to the cathode 620 and the measured value of the coolant temperature sensor 51.

Therefore, the controller 500 of the fuel cell system according to an exemplary embodiment of the present disclosure may derive the target supply flow rate of hydrogen based on the required current of the fuel cell stack 600, and may determine the target supply pressure of hydrogen based on the target supply flow rate of hydrogen and the pressure estimate value of hydrogen.

Also, the controller 500 of the present disclosure is configured to control the opening or closing of the supply valve 300 to follow the determined target supply pressure of hydrogen. In the instant case, the opening or closing control of the supply valve 300 may utilize a constant duty pulse control as illustrated in FIG. 5, and a specific control method or operating principle in this regard will be described later.

On the other hand, the controller 500 of the fuel cell system according to an exemplary embodiment of the present disclosure may derive the concentration estimate value of hydrogen inside the anode 610 based on the pressure estimate value of hydrogen, and may determine the target discharge flow rate of hydrogen based on the concentration estimate value of hydrogen (which is represented by S221 and S222 in FIG. 2).

That is, the target discharge flow rate of hydrogen may be determined based on the concentration estimate value of hydrogen, which is derived based on the pressure estimate value of hydrogen. Here, the concentration estimate value of hydrogen may be estimated based on the diffusion amount of the gas inside the anode 610 of the fuel cell stack 600 and the pressure estimate value of hydrogen. For reference, the diffusion amount of the gas may be understood to mean the number of moles according to the cross-over of hydrogen and nitrogen determined based on Fick's law.

The controller 500 of the present disclosure determines a change amount in the pressure estimate value of hydrogen according to gas diffusion. That is, the number of moles of nitrogen diffusing from the cathode 620 into the anode 610 and the number of moles of hydrogen diffusing from the anode into the cathode 620 are determined, respectively, and the determined numbers of moles are applied to an ideal gas equation to determine a change amount in the pressure estimate value of hydrogen. The determined change amount in the pressure estimate value of hydrogen is used to determine the flow rate per unit time each gas is discharged through a purge.

A more specific method or operating principle for estimating the hydrogen concentration of the anode 610 is apparent to those skilled in the art, so a detailed description thereof will be omitted.

As a result, the controller 500 of the present disclosure is configured to control the opening or closing of the discharge valve 400 to follow the determined target discharge flow rate of hydrogen. As in the case of the supply valve 300 above, the opening or closing control of the discharge valve 400 may utilize a constant duty pulse control as illustrated in FIG. 5, and a specific control method or operating principle in this regard will be described later.

Next, the 'process of differently estimating the pressure estimate value of hydrogen for each open or closed state of each of the supply valve 300 and the discharge valve 400' will be described.

Prior to the present description, referring to FIG. 3, FIG. 4, and FIG. 5, it will be described the tendency of changes in the hydrogen pressure measured by the hydrogen pressure sensor 200 and in the pressure of hydrogen flowing into the anode 610 of the fuel cell stack 600 from the rear end portion of the ejector 100 when the open duty pulse of each of the supply valve 300 and the discharge valve 400 is variably controlled.

FIG. 3 is a view for describing estimating the pressure of hydrogen flowing into the anode 610 of the fuel cell stack 600 from the rear end portion of the ejector 100 for each open or closed state of each of the supply valve 300 and the discharge valve 400, FIG. 4 is a view for illustrating variably controlling the opening duty pulse of each of the supply valve 300 and the discharge valve 400 based on the pressure estimate value of hydrogen, and FIG. 5 is a view for describing the open duty pulses of the supply valve 300 and discharge valve 400.

First, in FIG. 5, 'section G' represents the opening of the supply valve 300 or the discharge valve 400, and 'section H' represents the closing of the supply valve 300 or the discharge valve 400. Also, it is understood that sections B, C, D, E, and F in FIG. 3 correspond to sections b, c, d, e, and fin FIG. 4, respectively.

Furthermore, it should be understood that the respective sections in FIG. 3 and FIG. 4 are independent. That is, the respective sections are not in a continuous relationship with each other, and these sections are merely arbitrarily divided sections for describing the tendency of changes in the pressure of hydrogen measured by the hydrogen pressure sensor 200 and in the pressure of hydrogen flowing into the anode 610 of the fuel cell stack 600 from the rear end portion of the ejector 100.

First, section B in FIG. 3 and section b in FIG. 4 will be described. In section b in FIG. 4, only the open duty pulse of the supply valve 300 is controlled, and the discharge valve 400 is always controlled in a closed state. In the instant case, in section B in FIG. 3 corresponding to section b in FIG. 4, according to the open state of the supply valve 300, the hydrogen pressure measured by the hydrogen pressure sensor 200 (Hydrogen pressure measured by Sensor) is controlled to flow the target supply pressure of hydrogen (Target supply pressure of Hydrogen), and the pressure of hydrogen (Hydrogen Pressure (Estimated)) flowing into the anode 610 of the fuel cell stack 600 from the rear end portion of the ejector 100 is controlled to follow the actual pressure (Hydrogen Pressure (Actual)) of hydrogen inside the anode. For reference, the trends of section B in FIG. 3 and section b in FIG. 4 controlled as above are the same in the case of section F in FIG. 3 and section fin FIG. 4.

Next, section C in FIG. 3 and section c in FIG. 4 will be described. In section c in FIG. 4, only the open duty pulse of the discharge valve 400 is controlled, and the supply valve 300 is always controlled in a closed state. In the instant case, in section C in FIG. 3 corresponding to section c in FIG. 4, according to the open state of the discharge valve 400, the pressure of hydrogen (Hydrogen Pressure (Estimated)) flowing into the anode 610 of the fuel cell stack 600 from the rear end portion of the ejector 100 is controlled to follow the actual pressure of hydrogen (Hydrogen Pressure (Actual)) inside the anode 610. In the instant case, since the supply valve 300 is always in a closed state, the hydrogen pressure (Hydrogen Pressure measured by Sensor) measured by the hydrogen pressure sensor 200 changes linearly as the flow rate of the supplied hydrogen decreases. For reference, the trends of section C in FIG. 3 and section c in FIG. 4 controlled as above are the same in the case of section E in FIG. 3 and section e in FIG. 4.

In section D in FIG. 3 and section d in FIG. 4, the open duty pulses of the supply valve 300 and discharge valve 400 are simultaneously controlled. In the instant case, when the supply valve 300 is opened, the discharge valve 400 is always controlled in a closed state, and when the discharge valve 400 is opened, the supply valve 300 is always controlled in a closed state. That is, the supply valve 300 and the discharge valve 400 are not controlled in an open state at the same time. This is because the control of the supply valve 300 and discharge valve 400 according to the controller 500 of the present disclosure to is configured to follow the target supply pressure of hydrogen and the actual pressure of hydrogen inside the anode 610. However, if the supply valve 300 and the discharge valve 400 are opened at the same time, hydrogen is discharged simultaneously with the inflow of hydrogen, which is against the purpose of control.

Consequently, the hydrogen pressure (Hydrogen Pressure measured by Sensor) measured by the hydrogen pressure sensor 200 according to the open or closed state of the supply valve 300 and discharge valve 400 is controlled to follow the target supply pressure of hydrogen (Target supply pressure of Hydrogen). Thus, it is possible to prevent excessive or insufficient hydrogen in the anode 610 of the fuel cell stack 600.

Furthermore, the pressure of hydrogen (Hydrogen Pressure (Estimated)) flowing into the anode 610 of the fuel cell stack 600 from the rear end portion of the ejector 100 is controlled to follow the actual pressure (Hydrogen Pressure (Actual)) of hydrogen inside the anode 610. Thus, there is an advantage in that the actual pressure of hydrogen inside the anode 610 may be estimated by estimating the pressure of hydrogen flowing into the anode 610 of the fuel cell stack 600 from the rear end portion of the ejector 100.

The controller 500 of the fuel cell system according to an exemplary embodiment of the present disclosure may derive a change amount in a flow rate of the gas inside the anode 610 for each open or closed state of each of the supply valve 300 and the discharge valve 400, may determine a change amount in the pressure inside the anode based on the derived change amount in the flow rate of the gas, and may estimate the pressure of hydrogen flowing into the anode 610 of the fuel cell stack 600 from the rear end portion of the ejector 100.

Here, the specific operating principle of deriving the change amount in flow rate of gas inside the anode 610 will be described later. The change amount in pressure inside the anode 610 may be determined by applying the derived change amount in flow rate of gas inside the anode 610 to the ideal gas equation, and may derive the pressure estimate value of hydrogen to be used in the next control by correcting the determined change amount in pressure inside the anode 610 to the pressure estimate value of hydrogen in the previous control.

For reference, when determining the change amount in pressure inside the anode 610, information related to the current temperature of the fuel cell stack 600 and the volume inside the anode 610 is utilized. Because the specific operating principle related thereto is apparent to those skilled in the technical field of the present disclosure of the present disclosure, a detailed description thereof will be omitted.

On the other hand, as described above with reference to FIG. 3, FIG. 4, and FIG. 5, in an exemplary embodiment of the present disclosure, either the supply valve 300 or the discharge valve 400 may be controlled in an open state, or both the supply valve 300 and the discharge valve 400 may be controlled in a closed state. That is, this is all divided into three states of a state where 'the supply valve 300 is open and the discharge valve 400 is closed', a state where 'the supply valve 300 is closed and the discharge valve 400 is opened', and a state where 'both the supply valve 300 and the discharge 400 are closed'. In each case, the process of deriving the change amount in flow rate of gas inside the anode 610 is controlled differently. Hereinafter, the process of deriving a change amount in flow rate of gas inside the anode 610 in each case will be described in detail.

First, in a state in which the supply valve 300 is opened and the discharge valve 400 is closed, the controller 500 of the fuel cell system according to an exemplary embodiment of the present disclosure may determine consumption amount of hydrogen inside the anode 610 and supply amount of hydrogen supplied into the anode 610, and may derive the change amount in flow rate of gas inside the anode 610 based on the determined consumption amount of hydrogen and supply amount of hydrogen.

In the instant case, the consumption amount ($Q_U$) of hydrogen inside the anode 610 may be determined based on the output current of the fuel cell stack 600 in a state in which the supply valve 300 is opened and the discharge valve 400 is closed.

Also, the supply amount ($Q_S$) of hydrogen supplied into the anode 610 may be determined based on the pressure of hydrogen measured by the hydrogen pressure sensor 200 and the pressure estimate value of hydrogen in a state in which the supply valve 300 is opened and the discharge valve 400 is closed.

The supply amount ($Q_S$) of the hydrogen supplied into the anode 610 is determined based on a difference between the measured pressure value of hydrogen measured by the hydrogen pressure sensor 200 and the pressure estimate value of hydrogen estimated in a previous control process in a state in which the supply valve 300 is opened and the discharge valve 400 is closed, and the consumption amount ($Q_U$) of hydrogen inside the anode 610 is determined based on the ideal gas equation.

Also, based on the determined supply amount ($Q_S$) of hydrogen and consumption amount ($Q_U$) of hydrogen, the amount ($Q_T$) of change in flow rate of gas inside the anode 610 is derived. In the present time, in a state in which the supply valve 300 is opened and the discharge valve 400 is closed, as illustrated in 'S113' in FIG. 2, the relational expression of '$Q_S - Q_U - Q_T = 0$' may be applied.

A specific method or operating principle for determining the supply amount ($Q_S$) of hydrogen supplied into the anode 610 and the consumption amount ($Q_U$) of hydrogen inside the anode 610 is apparent to those skilled in the technical field of the present disclosure of the present disclosure, so a detailed description thereof will be omitted.

Next, in a state in which the supply valve 300 is closed and the discharge valve 400 is opened, the controller 500 of the fuel cell system according to an exemplary embodiment of the present disclosure may determine the consumption amount of hydrogen inside the anode 610 and the discharge amount of gas discharged through the discharge valve, and may derive a change amount in flow rate of gas inside the anode 610 based on the determined consumption amount of hydrogen and discharge amount of gas.

In the instant case, the consumption amount of hydrogen inside the anode 610 may be determined based on the output current of the fuel cell stack 600 in a state in which the supply valve 300 is closed and the discharge valve 400 is opened.

Accordingly, the discharge amount of gas discharged through the discharge valve 400 may be determined based on a pressure difference between inlet and outlet of the discharge valve 400 and the pressure estimate value of hydrogen in a state in which the supply valve 300 is closed and the discharge valve 400 is opened.

Here, the consumption amount ($Q_U$) of hydrogen inside the anode 610 is determined by the same method as described above, and a repeated description thereof will be omitted.

The discharge amount ($Q_E$) of gas discharged through the discharge valve 400 may be expressed as a value obtained by subtracting the consumption amount ($Q_U$) of hydrogen and the amount ($Q_T$) of change in gas from the supply amount ($Q_S$) of hydrogen. In the present control process, since the supply valve 300 is in a closed state, there is no supply amount of hydrogen.

Therefore, as illustrated in 'S123' in FIG. 2, the relational expression of '$Q_U$–$Q_T$=$Q_E$' is applied to the finally derived amount ($Q_T$) of change in flow rate of gas inside the anode 610.

Subsequently, the controller 500 of the fuel cell system according to an exemplary embodiment of the present disclosure may determine the consumption amount of hydrogen inside the anode 610 based on the output current of the fuel cell stack 600 in a state in which the supply valve 300 and the discharge valve 400 are both closed, and may derive the change amount in flow rate of gas inside the anode 610 based on the determined consumption amount of hydrogen.

Similarly in the case of the present control process, the consumption amount ($Q_U$) of hydrogen inside the anode 610 is determined by the same method as described above, and a repeated description thereof will be omitted.

In the instant case, since both the supply valve 300 and the discharge valve 400 are closed so that neither the supply amount ($Q_S$) of hydrogen nor the consumption amount ($Q_U$) of hydrogen exists, the relational express of '$Q_U$–$Q_T$=0' is applied to the finally derived amount ($Q_T$) of change in flow rate of gas inside the anode 610, as illustrated in 'S133' in FIG. 2.

In conclusion, as described above, by controlling the change amount in flow rate of gas inside the anode 610 to be derived differently for each open or closed state of the supply valve 300 and the discharge valve 400, the pressure ($P_{E,n=1,\ 2,\ 3\ \ldots}$) of hydrogen flowing into the anode 610 of the fuel cell stack 600 from the rear end portion of the ejector 100 may be clearly estimated.

Referring to FIG. 2, the method for controlling the fuel cell system according to an exemplary embodiment of the present disclosure includes the steps of estimating, in the controller, the pressure of hydrogen flowing into the anode of the fuel cell stack from the rear end portion of the ejector for each open or closed state of each of the supply valve and the discharge valve (S100) and controlling, in the controller, the supply valve and the discharge valve based on the pressure estimate value of hydrogen (S200).

In the method for controlling the fuel cell system according to an exemplary embodiment of the present disclosure, the step (S100) of estimating the pressure of hydrogen flowing into the anode of the fuel cell stack from the rear end portion of the ejector may include the steps of deriving, in the controller, a change amount in flow rate of gas inside the anode for each open or closed state of each of the supply valve and the discharge valve (S110, S120, S130), determining, in the controller, a change amount in pressure inside the anode based on the derived change amount in flow rate of gas (S140), and estimating, in the controller, the pressure of hydrogen flowing into the anode of the fuel cell stack from the rear end portion of the ejector based on the determined change amount in pressures (S150).

In the method for controlling a fuel cell system according to an exemplary embodiment of the present disclosure, the step (S110, S120, S130) of deriving the change amount in flow rate of gas inside the anode may include the steps of determining, in the controller, the consumption amount of hydrogen inside the anode (S111, S121, S131), determining, in the controller, a supply amount of hydrogen supplied into the anode or a discharge amount of the gas discharged through the discharge valve in a state in which either the supply valve or the discharge valve is in open (S112, S122), and deriving, in the controller, the change amount in flow rate of the gas inside the anode based on the determined consumption amount of hydrogen, supply amount of hydrogen, and discharge amount of gas (S113, S123, S133).

In the method for controlling a fuel cell system according to an exemplary embodiment of the present disclosure, the step (S200) of controlling the supply valve and the discharge valve may include the steps of determining, in the controller, a target supply pressure of hydrogen and a target discharge flow rate of hydrogen based on the pressure estimate value of hydrogen (S210, S220), controlling, in the controller, the supply valve based on the target supply pressure of hydrogen (S230), and controlling, in the controller, the discharge valve based on the target discharge flow rate of hydrogen (S240).

In each step of the method for controlling the fuel cell system according to an exemplary embodiment of the present disclosure, the predetermined control method or operating principle by the controller is the same as that described above in the fuel cell system according to an exemplary embodiment of the present disclosure, and thus repeated description thereof will be omitted.

Therefore, as described above, according to the fuel cell system and the control method of the present disclosure, by estimating the pressure of hydrogen flowing into the anode 610 of the fuel cell stack for each open or closed state of each of the supply valve 300 and the discharge valve 400, it is possible to estimate the hydrogen pressure even if a problem occurs in a plurality of hydrogen low pressure sensors at the same time.

Furthermore, by performing feedback control of the supply valve 300 and the discharge valve 400 based on the pressure estimate value of hydrogen, it is possible to prevent excessive or insufficient hydrogen inside the anode 610 of the fuel cell stack 600. Accordingly, there is an advantage in that the durability of the fuel cell stack 600 and the fuel efficiency of the vehicle are improved by minimizing the deterioration of the fuel cell stack 600 due to the excessive hydrogen and the reduction of the fuel efficiency of the vehicle due to the hydrogen shortage.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various exemplary embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell system comprising:

an ejector provided in a hydrogen supply line;

a hydrogen pressure sensor provided in the hydrogen supply line at a front end portion of the ejector and configured to measure a pressure of hydrogen flowing in from a hydrogen tank connected to the hydrogen supply line;

a supply valve provided in the hydrogen supply line at a front end portion of the hydrogen pressure sensor and configured to control a flow rate of the hydrogen supplied from the hydrogen tank to an anode of a fuel cell stack of the fuel cell system;

a discharge valve provided in a hydrogen discharge line fluidically connected to the anode; and a controller electrically connected to the supply valve and the discharge valve and configured to distinctly estimate the pressure of the hydrogen flowing into the anode of the fuel cell stack from a rear end portion of the ejector for each open or closed state of each of the supply and discharge valves, and to control the supply and discharge valves based on a pressure estimate value of the hydrogen, wherein the controller is configured to determine a target supply pressure of the hydrogen and a target discharge flow rate of the hydrogen based on the pressure estimate value of the hydrogen, to control the supply valve based on the target supply pressure of the hydrogen, and to control the discharge valve based on the target discharge flow rate of the hydrogen.

2. The fuel cell system of claim 1, wherein the controller is configured to estimate the pressure of the hydrogen measured by the hydrogen pressure sensor as an initial pressure of the hydrogen flowing into the anode of the fuel cell stack from the rear end portion of the ejector.

3. The fuel cell system of claim 1, wherein the controller is configured to derive a target supply flow rate of the hydrogen based on a required current of the fuel cell stack, and to determine the target supply pressure of the hydrogen based on the target supply flow rate of the hydrogen and the pressure estimate value of the hydrogen.

4. The fuel cell system of claim 1, wherein the controller is configured to derive a concentration estimate value of the hydrogen inside the anode based on the pressure estimate value of the hydrogen, and to determine the target discharge flow rate of the hydrogen based on the concentration estimate value of the hydrogen.

5. The fuel cell system of claim 1, wherein the controller is configured to derive a change amount in flow rate of gas inside the anode for each open or closed state of each of the supply valve and the discharge valve, to determine a change amount in the pressure inside the anode based on the derived change amount in the flow rate of the gas, and to estimate the pressure of the hydrogen flowing into the anode of the fuel cell stack from the rear end portion of the ejector based on the determined change amount in the pressure.

6. The fuel cell system of claim 5, wherein the controller is configured to determine a consumption amount of the hydrogen inside the anode and a supply amount of the hydrogen supplied into the anode in a state in which the supply valve is open and the discharge valve is closed, and to derive a change amount in flow rate of the gas inside the anode based on the determined consumption amount of the hydrogen and the determined supply amount of the hydrogen.

7. The fuel cell system of claim 6, wherein the controller is configured to determine the consumption amount of the hydrogen inside the anode based on an output current of the fuel cell stack in a state in which the supply valve is open and the discharge valve is closed, and to determine the supply amount of the hydrogen supplied into the anode based on the pressure estimate value of the hydrogen and the pressure of the hydrogen measured by the hydrogen pressure sensor in a state in which the supply valve is open and the discharge valve is closed.

8. The fuel cell system of claim 5, wherein the controller is configured to determine a consumption amount of the hydrogen inside the anode and a discharge amount of the gas discharged through the discharge valve in a state in which the supply valve is closed and the discharge valve is open, and to derive the change amount in the flow rate of the gas inside the anode based on the determined consumption amount of the hydrogen and the determined discharge amount of the gas.

9. The fuel cell system of claim 8, wherein the controller is configured to determine the consumption amount of the hydrogen inside the anode based on an output current of the fuel cell stack in a state in which the supply valve is closed and the discharge valve is open, and to determine the discharge amount of the gas discharged through the discharge valve based on the pressure estimate value of the hydrogen and a pressure difference between an inlet and outlet of the discharge valve in a state in which the supply valve is closed and the discharge valve is open.

10. The fuel cell system of claim 5, wherein the controller is configured to determine the consumption amount of the hydrogen inside the anode based on an output current of the fuel cell stack in a state in which the supply valve and the discharge valve are closed, and to derive the change amount in the flow rate of the gas inside the anode based on the determined consumption amount of the hydrogen.

* * * * *